INVENTOR.
RAYMOND WILLIAM CLARKE
BY
Frank R. Trifari
AGENT

INVENTOR.
RAYMOND W. CLARKE
BY
Frank R. Jifai
AGENT

United States Patent Office 3,238,379

Patented Mar. 1, 1966

3,238,379
ELECTRICAL LOGICAL CIRCUIT

Raymond William Clarke, Horley, Surrey, England, assignor to North American Philips Company, Inc., New York, N.Y., a corporation of Delaware Filed Dec. 12, 1962, Ser. No. 244,064
Claims priority, application Great Britain, Dec. 21, 1961, 45,834/61
7 Claims. (Cl. 307—88.5)

This invention relates to electric logical circuits and more particularly to binary circuit arrangements of the half-adder type.

Basically, all binary adder circuit arrangements are made up of a circuit having three input terminals and two output terminals.

In practice it is usually found convenient to break up the functions of the basic adder into two separate operations effected by two separate circuits conveniently known as "half-adders." In this arrangement each half-adder has only two input terminals and two output terminals, the latter providing respectively a sum or partial sum output and a carry output.

A half-adder according to this invention employs as part of its circuit a 2-input exclusive-OR circuit.

A known 2-input exclusive-OR circuit comprises a first transistor and a second transistor of the same conductivity type, the transistors having a common collector circuit providing output signals to a signal output terminal, a first signal input terminal, a second signal input terminal, a connection between the base of the first transistor and said second input terminal, a connection between the base of the second transistor and said first input terminal, a first signal current path through a first impedance from said first input terminal to a D.C. supply point, a second signal current path through a second impedance from said second input terminal to said D.C. supply point, a connection from the emitter of the first transistor to the first impedance to permit diversion of part of any signal input current from the D.C. supply point to the emitter-collector path of the first transistor, and a connection from the emitter of the second transistor to the second impedance to permit diversion of part of any signal input current from the D.C. supply point to the emitter-collecor path of the second transistor, at least one of said emitter connections being taken to a tap on the respective impedance while the other emitter connection is taken either to a tap on the respective impedance or to the end of the latter impedance constituting the respective input terminal. In operation the D.C. supply point is connected to a source of reference potential.

It is possible to improve this 2-input exclusive-OR circuit by providing, for the purpose of catching the emitter voltage of the transistors, additional circuit elements in the form of an asymmetrically conductive path connected between each impedance and a catching D.C. supply point which has the same direction, or preferred direction, of conduction for input signals as the respective transistor. The transistor and corresponding asymmetrically conductive path of each half of the circuit may be chosen with a certain relationship so as to fulfil stated conditions when constant-current inputs are employed. This relationship is not necessary if the asymmetrically conductive paths are taken to a separate catching supply point held at a suitable potential different from that of the reference D.C. supply point.

It is an object of the present invention to provide a simple modification and simple additional circuitry for converting exclusive-OR circuits into half-adder circuits.

The present invention provides a binary half-adder circuit arrangement comprising circuitry having a configuration corresponding to an exclusive-OR circuit of the above mentioned type including in combination the emitter-base section of a third transistor in series in the connection to the D.C. reference supply point of the exclusive-OR circuit, the base of said third transistor being connected to said D.C. supply point, the half-adder circuit arrangement also comprising a carry output terminal connected to the collector of said third transistor.

When two input currents are present, the third transistor of this arrangement provides, through the D.C. reference supply point, a carry output from current which would otherwise be drained or "lost." The output terminal connected to the collectors of the first and second transistors acts as the sum output terminal.

Circuit arrangements according to the invention operate as half-adder circuits when a logical 1 is represented by the presence of a current and a logical 0 by the absence, or near-absence of a current, and this condition will be assumed in the following description.

The circuit according to the invention may employ input signals which are current signals or predominantly current signals, and the first and second input impedance paths can perform their two stated functions in either case. If input currents are supplied from so-called "constant current" sources (i.e. sources with internal impedances which are very high as compared with the impedances of the logical circuit) then the diversion of input current from the D.C. supply point to the first or second transistor can be regarded as a current routing operation rather than as a current interrupting operation since the current delivered by the D.C. supply point remains uninterrupted. Since the output of the collector circuit of each transistor has its origin from a high impedance source, this output is a constant current output, which readily allows the connection of stages in cascade with the output of one stage applied directly as an input to a succeeding stage.

In practice, the collectors should be connected to loads such as to prevent bottoming. If this is not done, the routing of current from one transistor to another may be adversely affected and the speed of operation reduced.

Specific embodiments of the invention employing p-n-p junction transistors will now be described by way of example with reference to the accompanying drawings, in which.

Figure 1:
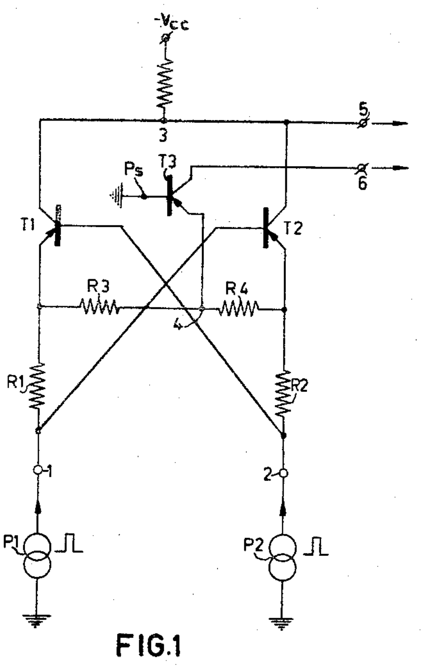
FIGURE 1 shows a circuit based on a modification of a known exclusive-OR circuit.

Referring to FIGURE 1, P1 and P2 are schematic representations of two external binary input pulse signal sources (D.C. inputs could also be used) connected to the first and second input terminals 1 and 2 of the half adder circuit.

The common collector point 3 of the first and second transistors T1 and T2 is connected to the output terminal 5 which is the sum output terminal of the half-adder.

The first and second impedances are pairs of resistances $R_1$, $R_2$ and $R_3$, $R_4$ respectively.

Both the emitters are connected to the junction points of the pairs of resistors $R_1$, $R_3$ and $R_2$, $R_4$ which are proportioned so that when the junction point 4 of the resistors $R_3$ and $R_4$ is grounded and when both inputs are 1, the base electrodes of the transistors are more positive than the emitters. The junction point 4 is grounded, however, through the emitter-base path of a third p-n-p transistor $T_3$ to a point $Ps$ at ground potential.

Figure 5:
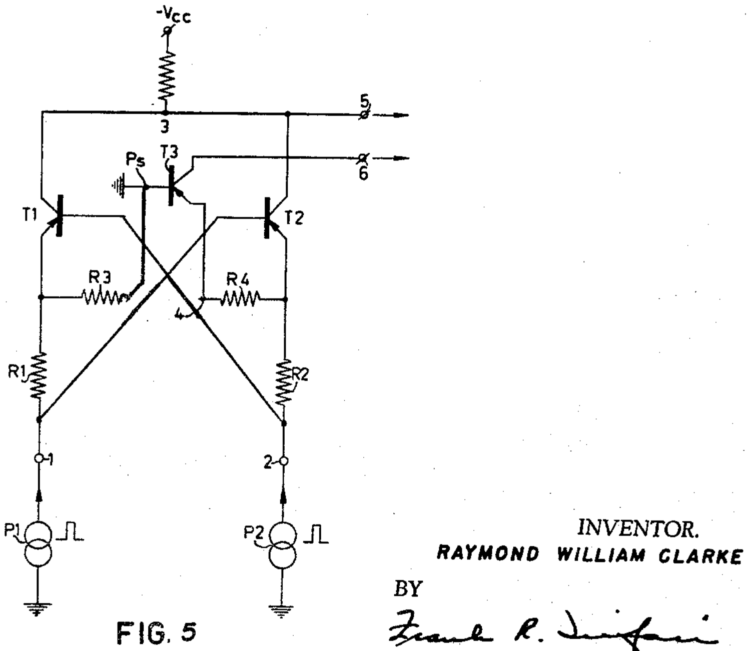
FIGURE 5 shows a modification of the circuit of FIGURE 1.

The collector of transistor T3 is connected to a carry output terminal 6. Without the ground connection, when two inputs are present, substantially the sum of the input currents will flow to the collector of T3. In these circumstances, the carry output has a value equal to two input currents. This is permissible in some circumstances but it is frequently desirable to adopt a unit of current corresponding substantially to one input current, and to ensure that the sum and carry output currents of the circuit are each equal to one of such units. This can be achieved in a simple manner by connecting to ground the base of the transistor $T_3$ and connecting a resistance of appropriate value between the emitter and base of this transistor T3 so as to bleed substantially half the carry current. Although this arrangement is very simple and economical, the percentage of current bled will depend on the manufacturing spreads of the transistors used for T3 and on temperature. This problem can be overcome by using the circuit of FIGURE 4 (which will be described below) or the modification of FIGURE 5, wherein only one of the resistors R3 or R4 is taken to the emitter T3 and the other resistor is connected directly to the reference supply point P*s*, there being no connection between these resistors. The carry current is now approximately one unit of current for two inputs and substantially zero current in the other input conditions. In this circuit the carry output current is made substantially equal to one input current for the reason that one of the two input currents is routed substantially entirely through transistor T3 while the input current in the other half of the circuit is routed directly to the reference supply terminal in such manner as to by-pass transistor T3.

Transistor T3 may be of the same type as transistors T1 and T2 and the components and values used for the circuit of FIGURE 1 may, for example, be as follows:

*Table*

| | |
|---|---|
| R1, R2 | 120 Ω each. |
| R3, R4 | 220 Ω each. |
| T1, T2 | Mullard germanium type 0C43 or ASZ21. |
| Signal input | 10 ma. on each side. |

Figure 2:
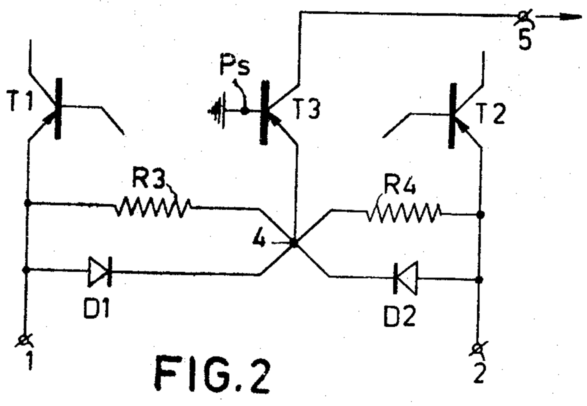
FIGURES 2 and 3 show circuits based on modifications of other known exclusive-OR circuits.

Referring now to FIGURE 2 steps may be taken to ensure that the carry output from the collector of T3 has a value substantially equal to one unit of current. This may be achieved by connecting two diodes D1 and D2 in parallel to the resistors R3 and R4. The modification mentioned above, whereby one of the resistors R3 and R4 is connected directly to point P*s*, may also be used. In this last case the connections of the diodes D1 and D2 are modified such that if, for example, the resistor R3 is connected directly to P*s*, then D1 is also connected directly to P*s*, and the direct connection between D1 and D2 is broken.

The circuit of FIGURE 2 may employ the values and components given in the above table by way of illustration for FIGURE 1, in which case the diodes D1–D2 may be silicon diodes of Mullard Type 0A202 or American Type 1N914 (in this case 0C43 transistors are intended for use with 0A202 diodes while ASZ21 transistors are for use with 1N914 diodes).

Figure 3:
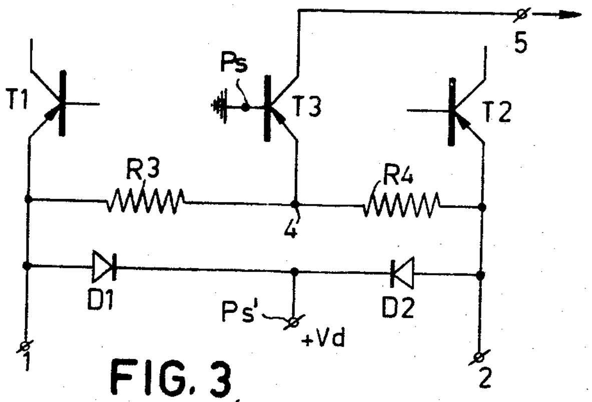

Referring now to FIGURE 3, the diodes D1–D2 are connected to a separate D.C. supply point P*s*′, this point being held at a constant potential +V*d*. If the values and components of the above table are used again, the diodes may be germanium diodes of Mullard Type AAZ13 with a potential V*d* of +0.5 volts. Germanium diodes can be used (in place of the silicon diodes of FIGURE 2) with germanium transistors for reasons explained in the second specification. In this case the carry current can be limited to one current unit simply by a suitable choice of the values of R3, R4 and V*d*.

Figure 4:
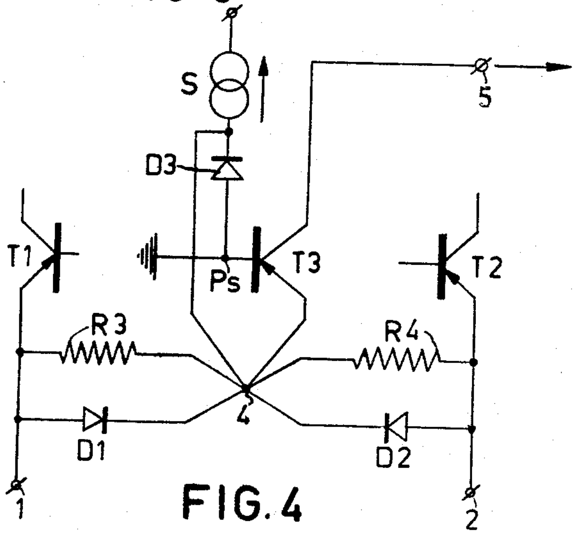
FIGURE 4 shows a variant of the circuit of the third transistor.

The part of FIGURE 4 delivering the carry output is suitable for both of the circuits of FIGURES 1 and 2 although it is shown applied to the circuit of FIGURE 2. Referring to FIGURE 4, it will be seen that an additional diode D3 and a constant-current source S of unit current I (i.e. to one input current) are added for the purpose of ensuring that the carry output is substantially equal to one unit of current. Broadly, the circuit operates so that source S subtracts one unit of current from the carry current of substantially two units which would otherwise be produced by two signal inputs of unit value.

More particularly, with no current signal inputs, a one-unit current flows from the earthed D.C. supply point P*s* through D3 to source S causing a voltage drop across D3 which acts as a reverse bias for the emitter junction of transistor T3. With one input signal, a current much smaller than I flows through R3 and R4 to source S thus reducing the current in D3. With two input currents, the total current flowing through R3 and R4 is substantially equal to 2I so that substantially a current with strength I flows to S and a current with strength I flows through T3; thus diode D3 is cut off by a voltage equal to the base-emitter voltage of transistor T3 in its conducting state. The source S may simply be a resistor of sufficiently high value connected to a supply rail held at a sufficiently high voltage.

In FIGURES 2 and 4 the diodes have been shown connected to the negative ends of R1 and R2 but they may alternatively be connected to the positive (i.e. input) ends of R1 and R2. If this were done in the case of FIGURE 2 or FIGURE 4, a different effective threshold value would be chosen for the diodes D1–D2. If done in the case of FIGURE 3, it is sufficient to raise appropriately the value of +V*d*.

While the invention has been described with respect to specific embodiments, various changes and modifications will be readily apparent to those skilled in the art without departing from the inventive concept, the scope of which is set forth in the appended claims.

What is claimed is:

1. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, each emitter of said first and second transistors being connected to a point of a voltage divider one part of which is directly connected to the base of the other of said first and second transistors and the other part of which is connected to a point of constant potential in series with the emitter-base junction of said third transistor, the base of said third transistor being connected to said point of constant potential, said potential having a value such that both of said first and second transistors are non-conducting in the absence of voltages applied to said input terminals, the collector of said third transistor being connected to said carry output terminal.

2. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, at least two impedances connected in series and having a junction point and two end points, each emitter of said first and second transistors being connected to a respective end point, the junction point being connected to a point of constant potential in series with the emitter-base junction of said third transistor, the base of said third transistor being connected to said point of constant potential, said potential having a value such that both of said first and second transistors are non-conducting in the absence of voltages applied to said input terminals, the collector of said third transistor being connected to said carry output terminal, and an asymmetrically conductive path connected across each impedance.

3. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, at least two impedances connected in series and having a junction point and two end points, each emitter of said first and second transistors being connected to a respective end point, the junction point being connected to a first point of constant potential in series with the emitter-base junction of said third transistor, the base of said third transistor being connected to said point of constant potential, said potential having a value such that both of said first and second transistors are non-conducting in the absence of voltages applied to said input terminals, the collector of said third transistor being connected to said carry output terminal, and a pair of oppositely poled diodes connected across said impedances, the junction point of said diodes being connected to a second point of constant potential.

4. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, each emitter of said first and second transistors being connected to a point of a voltage divider one part of which is directly connected to the base of the other of said first and second transistors and the other part of which is connected to a point of constant potential in series with the emitter-base junction of said third transistor, the base of said third transistor being connected to said point of constant potential, said potential having a value such that both of said first and second transistors are non-conducting in the absence of voltages applied to said input terminals, the collector of said third transistor being connected to said carry output terminal, and an asymmetrically conductive path from the base of said third transistor to a source of constant potential.

5. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, at least two impedances connected in series and having a junction point and two end points, each emitter of said first and second transistors being connected to a respective end point, the junction point being connected to a first point of constant potential in series with the emitter-base junction of said third transistor, the base of said third transistor being connected to said point of constant potential, said potential having a value such that both of said first and second transistors are non-conducting in the absence of voltages applied to said input terminals, the collector of the third transistor being connected to said carry output terminal, a pair of oppositely poled diodes connected across said impedances, the junction point of said diodes and the junction point of said impedances being connected to a source of constant current, and a third diode connected from the base of said third transistor to said source of constant current.

6. A binary half-adder comprising first, second and third transistors of the same conductivity type, each transistor having base, emitter and collector electrodes, first and second output terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, two impedances each having two end points, the end points of one impedance being connected to one emitter of said first and second transistors and a point of constant potential, respectively, the end points of the other impedance being connected to the other emitter of said first and second transistors and to said point of constant potential in series with the emitter-base junction of said third transistor, respectively, the base of said third transistor being connected to said point of constant potential, said potential having a value such that both of said first and second transistors are non-conducting in the absence of voltages applied to said input terminals, the collector of said third transistor being connected to said carry output terminal.

7. A binary half-adder comprising first, second and third transistors of the same conductivity type, each transistor having base, emitter and collector electrodes, first and second input terminals, a sum output terminal and a carry output terminal, the base of said first transistor being directly connected to said second input terminal, the base of said second transistor being directly connected to said first input terminal, the emitter of said first transistor being connected through a first resistor to said first input terminal, the emitter of said second transistor being connected through a second resistor to said second input terminal, both collectors of said first and second transistors being connected to said sum output terminal and through a third resistor to a voltage source, two impedances each having two end points, an asymmetrically conductive path connected across each impedance, the end points of one impedance being connected to one emitter of said first and second transistors and a point of constant potential, respectively, the end points of the other impedance being connected to the other emitter of said first and second transistors and to said point of constant potential in series with the emitter-base junction of said third transistor, respectively, the base of said third transistor being connected to said point of constant potential, said potential having a value such that both of said first and second transistors are non-conducting in the absence of voltages applied to said input terminals, the collector of said third transistor being connected to said carry output terminal.

References Cited by the Examiner

UNITED STATES PATENTS

| | | | |
|---|---|---|---|
| 2,956,182 | 10/1960 | Norman | 328—159 |
| 3,074,639 | 1/1963 | Morgan et al. | 307—88.5 |
| 3,106,683 | 10/1963 | Creveleng | 328—93 |

ARTHUR GAUSS, *Primary Examiner.*